Oct. 27, 1953  C. J. CADWELL ET AL  2,656,631
FILM MOUNT SLIDE
Filed May 16, 1949
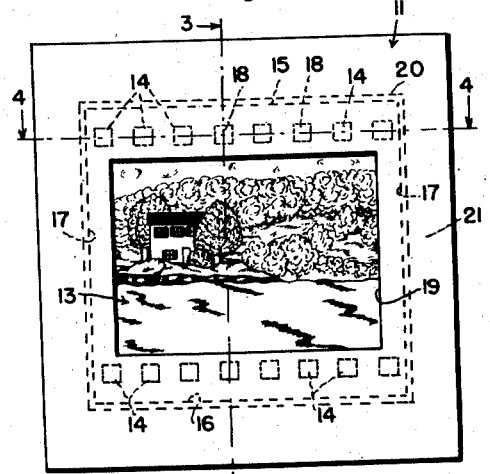
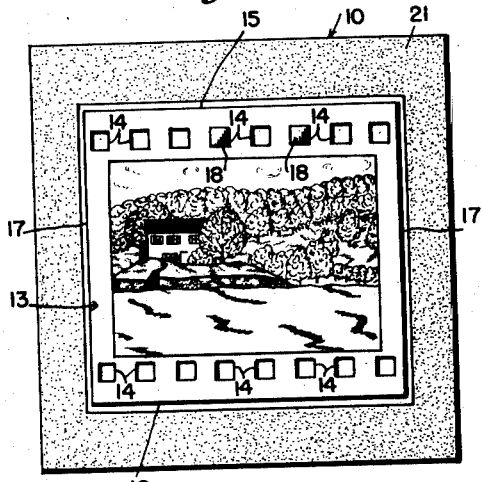
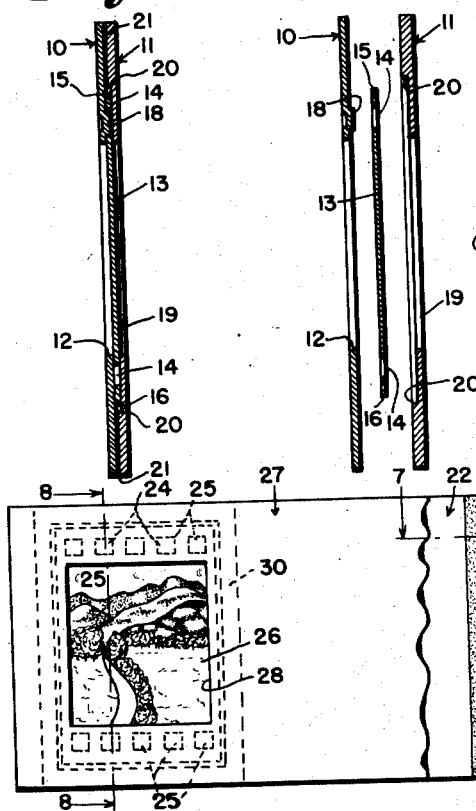
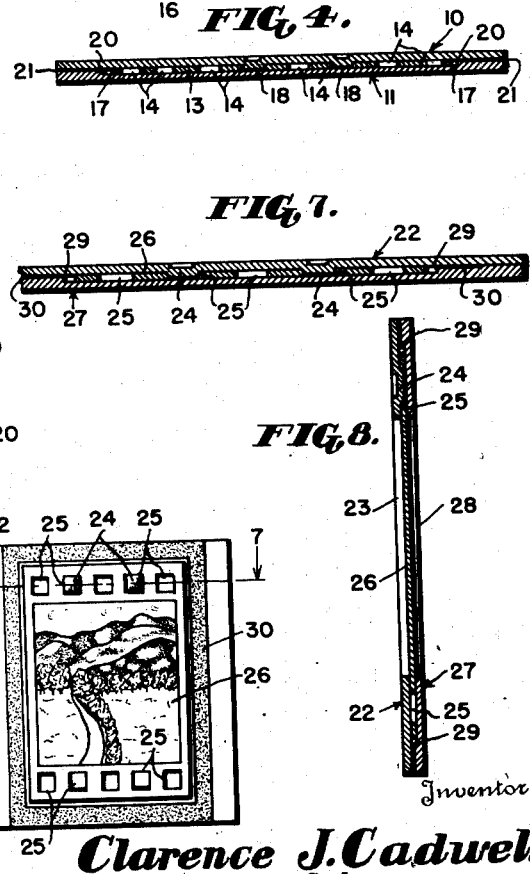
Inventor
Clarence J. Cadwell
Frank M. Adamson
By Wilfred Lawson
Attorney

UNITED STATES PATENT OFFICE 2,656,631

FILM MOUNT SLIDE

Clarence J. Cadwell, Carpinteria, and Frank M. Adamson, Los Angeles, Calif., assignors to The Cadwell Corporation, Beverly Hills, Calif., a corporation of California Application May 16, 1949, Serial No. 93,582

1 Claim. (Cl. 40—156)

This invention relates generally to improvements in mounts for cut film and is designed primarily as an improved mount for film for use in still picture projection machines either of the single picture or stereopticon type.

A principal object of the present invention is to provide an improved mount for cut film pictures designed particularly for use in association with the type of film having a series of equidistantly spaced apertures along one or both edges, wherein the accurate placement of the film in the mount may be accomplished easily and quickly whereby to effect the proper spacing of the edges of the film from an enclosing cover frame.

Another object of the invention is to provide an improved means of mounting cut film of the stereopticon type whereby the films upon the mount will be easily and quickly positioned and properly spaced one from the other.

Still another object of the invention is to provide an improved mount for cut film wherein the film is held in a prescribed position and maintained therein in such a manner that expansion and contraction of the film may take place as a result of changes in atmospheric conditions, or for other reasons, without causing the film to bulge or buckle, thereby eliminating the possibility of the picture projected from the film being out of focus.

Other objects and advantages of the invention will become apparent as the description of the same proceeds and the invention will be best understood from a consideration of the following detail description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in elevation of a complete film mount constructed in accordance with the present invention showing a film therein.

Figure 2 is a view corresponding to Figure 1 but showing the front frame removed.

Figure 3 is a sectional view taken substantially on the line 3—3 of Figure 1.

Figure 4 is a sectional view taken substantially on the line 4—4 of Figure 1 and at right angles to the section of Figure 3.

Figure 5 is a separated or exploded view of the mount and the film.

Figure 6 is a view in elevation of a stereopticon mount with a portion of the front or cover frame removed.

Figure 7 is a sectional view taken substantially on the line 7—7 of Figure 6.

Figure 8 is a sectional view taken substantially on the line 8—8 of Figure 6 and at right angles to the section of Figure 7.

In accordance with the present invention the mount comprises a base or back frame 10 and a front or cover frame 11.

The base or back frame has an opening 12 therein over which is placed the cut film, here designated generally by the numeral 13.

The present invention is designed for mounting either black and white or color film of the 35 mm. size, which is provided along its longitudinal edges with the spaced apertures 14 which are disposed outside of the field which registers the desired picture.

For convenience of description the edges or portions of the film in which the rows of apertures 14 are formed will be referred to as the top and bottom edges and the adjacent perpendicular edges will be defined as the side edges of the film. Accordingly, referring to Figure 2 the top and bottom edges of the film 13 are designated respectively 15 and 16 while the side edges are designated 17.

The height of the window opening 12 is accordingly slightly less than the distance between the top and bottom rows of apertures 14 while the width of the window opening is slightly less than the width of the film between the side edges 17 as shown in Figure 2.

Adjacent to either the top or bottom edge of the window opening 12, preferably the top edge, the material of the back frame 10 is extruded or punched forwardly slightly to provide the two lugs or spurs 18 which are spaced apart lengthwise of the adjacent edge of the opening, a distance corresponding to the distance between a selected two of the film apertures 14. Preferably the lugs or spurs 18 are spaced so that when each is engaged in an aperture 14 there will be an unoccupied aperture between the lugs as shown and also the lugs are so positioned with respect to a side edge of the window opening that the correct location of the film over the window opening is easily and quickly accomplished since the engagement of the lugs in any but the proper two openings would instantly show the error by failure of a side edge of the film to properly overlap a side of the opening.

The cover 11 is of the same overall dimensions as the base or backing 10 and it also has a window opening 19 of the same size as the opening 12.

Upon the rear face of the cover a recess 29 is cut out around the opening 19 which has overall vertical and lateral dimensions slightly greater than the height and width of the film. The excess in the size of the recess in the back of the cover 11 over the size of the film is such as to permit the limits of expansion of the film without causing the latter to buckle and it is found that an excess of .015" for the recess over the maximum width and height of the film is sufficient to take care of such changes.

The recess depth may be slightly greater than the thickness of the film, a depth of .008" being preferred. This depth is sufficient to accommodate films for taking color photographs as well as black and white films, the color picture films being slightly thicker than black and white.

It will, of course, be obvious that the forward projection of the lugs or spurs 18 should not be greater than the thickness of the film or only slightly so, so as not to interfer with the close positioning of the cover over the film and against the face of the back frame 10. While the invention is not limited to any specific dimension as to the size of the openings or the size of the recess 20, the depth of such recess or the length of the lugs or spurs, a satisfactory length for the spurs is approximately .006".

The forward face of the back frame 10, that is, the face against which the cover 11 is placed, is provided with a coating 21 of a suitable adhesive whereby when the cover frame 11 is placed in position, after the adhesive has been suitably moistened or otherwise made ready, the cover frame will adhere tightly to the back frame and thus produce the finished mounted picture.

In the application of the invention to mounts for stereopticon projection, the back frame or back body is in the form of a relatively long sheet of material of suitable character as indicated at 22. Such sheet of material is provided with window openings 23 in properly spaced relation and adjacent to the top edges, preferably, of the window openings, the material is forwardly pressed to provide the pair of lugs or spurs 24 for engagement in two apertures 25 of a film 26 placed over the window opening. The lugs or spurs 24 are preferably located so as to engage in the second and fourth apertures 25 of the film body, as a result of which the film will be properly located over the window and its side edges will overlap the frame backing body 22 to the proper extent.

The cover for the stereo mount is designated 27. This may be in the form of a single sheet of the same dimensions as the back sheet 22 or it may be in the form of two separate frames, as preferred.

Considering the cover 27 as a single sheet, such cover is provided with a pair of window openings 28 in properly spaced relation to match the openings 23 when the sheets 22 and 27 are placed one over the other and each opening 28 has formed therearound in the rear face of the cover, the recess 29 of the same dimensions and for the same purpose as the recess 20 of the single type mount.

Upon the forward face of the sheet 22 each opening 23 is surrounded by a band of adhesive 30 for securing the cover in position.

From the foregoing it will be readily apparent that the present invention provides an improved cut film mount having two outstanding advantages over mounts of the type at present available. First, the projecting lugs or prongs engage in the sprocket wheel holes 14 or 25 which are found in 35 mm. film and assure proper positioning of the cut film with respect to the window openings. Secondly, the mount cover, being provided with a recess or depression around the window opening therein, of slightly larger dimensions than the film which it receives, securely holds the film in position and at the same time permits the film to expand as necessary without buckling.

In those types of mounts which are at present in use the film is glued to the base and then covered. Because of this if the film buckles or bulges, as it has a tendency to do, a picture produced therefrom will be out of focus. In the present invention the film is not glued at all but is merely held between the front and rear frames while at the same time having room for expansion in all directions.

We claim:

In a stereopticon film mount slide, a cover frame in the form of an elongated flat pair of longitudinally spaced rectangular members having rectangular openings therein and a larger similarly shaped recess formed in its inner surface and uniformly bounding each of said openings, said recesses each being of a size to seat a picture section of a length of a motion picture film for the exposure of the picture through the complemental opening, a back frame of the same size and shape as that of the cover frame and having openings therein adapted to register with the first openings when the two frames are disposed in abutting relation, depressed portions, constituting lugs to engage in certain of the sprocket apertures of the said picture sections, formed inwardly of the back frame in spaced relation adjacent to and along the top and bottom edges of the said openings therein, said lugs having a height equal to the thickness of the said picture sections, and a cementitious coating between the contacting surfaces of the frames for securing the same in assembly with the picture sections.

CLARENCE J. CADWELL.
FRANK M. ADAMSON.

References Cited in the file of this patent

UNITED STATES PATENTS

| Number | Name | Date |
|---|---|---|
| 1,567,310 | Weeks | Dec. 20, 1925 |
| 2,088,944 | Young et al. | Aug. 3, 1937 |
| 2,292,312 | Wittel | Aug. 4, 1942 |
| 2,390,053 | Bradford | Dec. 4, 1945 |
| 2,527,765 | Roehrl | Oct. 31, 1950 |